United States Patent [19]

Bäumker

[11] Patent Number: 4,870,602

[45] Date of Patent: Sep. 26, 1989

[54] METHOD FOR DETERMINING ROUTE ANGLES

[75] Inventor: Manfred Bäumker, Freiburg, Fed. Rep. of Germany

[73] Assignee: Litef GmbH, Freiburg im Breisgau, Fed. Rep. of Germany

[21] Appl. No.: 944,804

[22] Filed: Dec. 19, 1986

[30] Foreign Application Priority Data

Dec. 20, 1985 [EP] European Pat. Off. ........... 85116345

[51] Int. Cl.[4] .............................................. G01C 17/38
[52] U.S. Cl. .................................. 364/571.02; 33/356; 33/357; 324/245
[58] Field of Search ................ 364/449, 453, 454, 457, 364/460, 571.02; 33/355 R, 356, 357; 324/245, 246; 73/178 R

[56] References Cited

U.S. PATENT DOCUMENTS

| | | | |
|---|---|---|---|
| 3,728,525 | 4/1973 | Adkar | 364/460 |
| 4,303,978 | 12/1981 | Shaw et al. | 364/453 |
| 4,321,678 | 3/1982 | Krogmann | 364/453 |
| 4,347,730 | 9/1982 | Fisher et al. | 73/178 R |
| 4,414,753 | 11/1983 | Moulin et al. | 33/357 |
| 4,725,957 | 2/1988 | Alberter et al. | 33/356 |

FOREIGN PATENT DOCUMENTS 2128749 5/1984 United Kingdom .

Primary Examiner—Gary Chin
Attorney, Agent, or Firm—Elliott N. Kramsky

[57] ABSTRACT

A method for the determining route angle and for automatically calibrating course accuracy with a three-axis magnetometer fixed to an aircraft despite the presence of interfering vehicle magnetic fields and instrumentation errors. The method is accomplished in flight and includes numerous computations to compensate the magnetometer's principal error sources. A calibration flight includes specified flight maneuvers (without change of position). The method is particularly suitable for helicopters equipped with three-axis magnetometers.

7 Claims, 1 Drawing Sheet

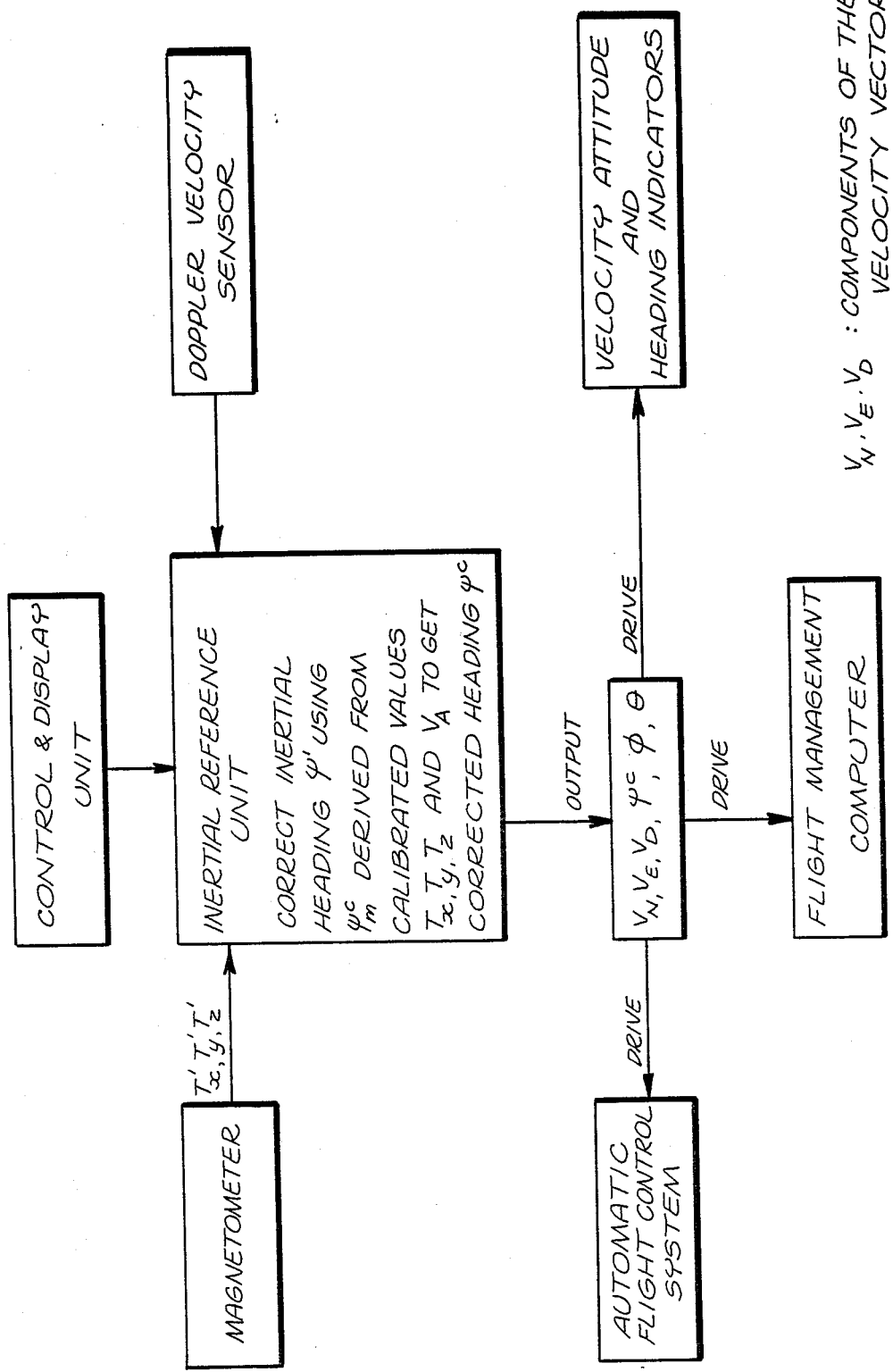

METHOD FOR DETERMINING ROUTE ANGLES

BACKGROUND

1. Field of the Invention

The invention relates to methods for determiing route angles. More particularly, this invention pertains to a method for determining route angles by means of and for the automatic calibration of a three-axis magnetometer that is fixedly mounted in an aircraft and is subject to interfering vehicle magnetic fields and instrumentation errors.

2. Description of the Prior Art

The three-axis magnetometer measures the earth's magnetic field. Magnetic field lines are oriented with respect to the magnetic north pole to determine course. The course determination process includes determining the vehicle's longitudinal axis.

Horizontal intensity H is obtained from the total intensity T and inclination I of the field lines with respect to the horizontal plane. That is, $$H = T \cdot \cos I \tag{1-1}$$

Similarly, vertical intensity V is derived as:

$$V = T \cdot \sin I \tag{1-2}$$

The unit of magnetic field measure is Oe or A/m (Oerstedt; 1 Oe=79.58 A/m; 1 A/m=0.01257 Oe). The total intensity of the earth's magnetic field varies from 15 to 60 A/m, while the inclination varies from 0° in the vicinity of the equator to 90° at the magnetic north and south poles. In central Europe, for example, total intensity is approximately 40 A/m and inclination is 65°.

In navigation, the difference between the geographic and magnetic north directions is required. This difference, known as declination or magnetic variation, is (as are total intensity and inclination) dependent upon location. In the vicinity of the poles, such difference becomes quite large (up to $\pm 180°$), while in central Europe, for example, it varies from $-10°$ to $+10°$.

Declination is defined:

$$\delta = \psi - \psi_m \tag{1-3}$$

where $\psi$ = true route angle (geographic north)
$\psi_m$ = magnetic route angle (magnetic north)

The magnetic field of the earth is not constant in time. Rather, it is subject to both long-term (or secular) and short-term changes. Short-term changes result, for example, from atmospheric disturbances such as magnetic storms, thunderstorms and northern lights. Long-term disturbances result from changes in the earth's fluid core (convection currents).

The following average values are representative for central Europe:

$$\frac{dT}{dt} \approx 0.04 \frac{A}{m} / \text{year}$$

$$\frac{dI}{dt} \approx 0.04° / \text{year}$$

$$\frac{d\Delta}{dt} \approx 0.15° / \text{year}$$

Local anomalies in the earth's magnetic field (e.g. ore deposits) also produce effects that interfere with magnetic course determination.

At the present time, the calibration of aircraft-fixed three-axis magnetometers requires the solution of a complex and poorly conditioned system of equations. Such equations can only be solved (if at all) in conjunction with the execution of specific extreme flight maneuvers.

The high degree of complexity of the system of equations generally mandates that calibration take place on a compensating turntable, with the various reference directions determined by means of a theodolite and integrated compass. In accordance with this (very costly) method, differences between the magnetic course and a reference direction are determined optomechanically. Reference points are attached to the aircraft at various positions on a circle and are compensated in either hardware or software. The calibration must be repeated not only upon exchange of the three-axis magnetometer, but also upon exchange or alteration of the magnetically active parts of the aircraft (such as a helicopter) or upon variation of the loading program.

SUMMARY AND OBJECTS OF THE INVENTION

It is, therefore, an object of the invention to provide an improved method for the determining route angle while automatically calibrating course accuracy in an aircraft that is equipped with a three-axis magnetometer.

It is a further object to provide a method that achieves the aforesaid object simply, rapidly, reliably, and without requiring turntable compensation, large computation efforts or extreme flight maneuvers.

The present invention achieves the preceding objects and overcomes problems of the prior art by providing, in a first aspect, a method automatic course calibration of the course accuracy determining route angle by means of a three-axis magnetometer that is fixedly mounted in an aircraft and is subject to interference fields and instrumental errors which method is initiated by determining initial reference direction at a preselected calibration location, characterized by a homogeneous magnetic field of known intensity and inclination that is free from anomalies, by means of at least one gyroscope having short-term stability.

The theoretical values of the mutually perpendicular reference components $T_x$, $T_y$ and $T_z$ of the earth's magnetic field required for the calibration are then determined. All route and course angle ranges (within established limiting roll and pitch angle values) required for calibration are then swept during a flight maneuver.

The deviations $\Delta T_x = T_x' - T_x$, $\Delta T_y = T_y' - T_y$ and $\Delta T_z = T_z' - T_z$ of the instantaneous magnetic field components from the reference components are continuously observed during the flight maneuver and such deviations are read into a computer.

Computations are undertaken with regard to equations set forth in the specification for deriving correction coefficients. The instantaneous magnetic field components are transferred to corrected intensity components $T_i^c = T_i' + V_i$ in accordance with equations set forth in the specification and the corrected route angle $\psi_m^c$ determined from such equations.

In another aspect, the invention provides a method for automatic calibration of the course accuracy of a three-axis magnetometer that is fixedly mounted in an aircraft and is subject to interference fields and instrumental errors, which method is initiated by providing an estimate of initial reference direction at a preselected calibration location that is characterized by a homogeneous magnetic field of known intensity and inclination and free from anomalies. The theoretical values of the mutually perpendicular components $T_x$, $T_y$ and $T_z$ of the earth's magnetic field required for calibration from the estimated initial reference direction are then determined by means of a gyroscope having short-term stability.

The alternative method then generally follows the prior method to determine corrected route angle $\psi_m{}^c$. Thereafter, a calibration flight is performed between at least two reference points, a course correction determined from data derived therefrom in accordance with equations set forth in the specification that follows and route angle determined as a function of, inter alia, the course correction.

The foregoing and other features and advantages of this invention will become further apparent from the detailed description that follows. Such written description is accompanied by a drawing Figure for illustrating the interconnection of the navigation system and devices in accordance with the present invention.

BRIEF DESCRIPTION OF THE DRAWINGS

The Figure illustrates the interconnection of the navigation system and devices in accordance with the present invention.

DETAILED DESCRIPTION

When an external magnetic field acts on a coil provided with an iron core through which an alternating current flows, a voltage is induced that is directly proportional to the magnetic field. The strength or intensity of the external magnetic field may be obtained by multiplying the induced voltage by a proportionality constant.

By arranging three such coils at right angles so that a first measurement axis is set up parallel to the longitudinal axis of the aircraft (positive being the direction of flight), a second axis arranged parallel to the transverse axis (positive sense to the right) and a third axis parallel to the vertical axis (positive downwards), the sensors measure the components $T_x$, $T_y$ and $T_z$ of the earth's magnetic field.

If the aircraft course angles ($\Phi$ = roll angle, = $\theta$ pitch angle) are known, then the measured quantities may be resolved into horizontal components ($H_x$ and $H_y$) and a vertical component V:

$$\begin{Bmatrix} H_x \\ H_y \\ V \end{Bmatrix} = C_B{}^H \begin{Bmatrix} T_x \\ T_y \\ T_z \end{Bmatrix} \qquad (2\text{-}1)$$

where $$C_B{}^H = \begin{Bmatrix} \cos\theta & \sin\theta \cdot \sin\Phi & \sin\theta \cdot \cos\Phi \\ 0 & \cos\Phi & -\sin\Phi \\ -\sin\theta & \cos\theta \sin\Phi & \cos\theta \cos\Phi \end{Bmatrix} \qquad (2\text{-}2)$$

Route angle $\psi_m$ is derived from the horizontal components $H_x$ and $H_y$ as follows:

$$\psi_m = \arctan \frac{-H_y}{H_x} \qquad (2\text{-}3)$$

Further, the angle of inclination may be calculated as:

$$I = \arctan \frac{V}{\sqrt{H_x{}^2 + H_y{}^2}}$$

The following sources of error affect the accuracy of the course information by a vehicle-mounted three-axis magnetometer: interfering magnetic fields (hard or soft iron) and instrumentation errors (scale factor errors, bias, and axis orientation errors).

Interfering magnetic fields are generated by magnetic and paramagnetic materials in the relatively close environment of the magnetic probe. A distinction can be drawn between a constant interfering field $T_{s1}$ (caused by hard iron parts) and a direction-dependent interfering field $T_{s2}$ (caused by soft iron parts). In a three-axis magnetometer, errors caused by instrumentation include zero point errors (bias $b_x$, $b_y$, $b_z$), scale factor errors ($k_x$, $k_y$, $k_z$) and axis orientation errors ($w_x$, $w_y$, $w_z$).

$T_x'$, $T_y'$, $T_z'$ represent the theoretical values $T_x$, $T_y$ and $T_z$ after correction for the above-described errors. Thus, $$\begin{Bmatrix} T_x' \\ T_y' \\ T_z' \end{Bmatrix} = \left( C_n{}^b \cdot \begin{Bmatrix} H \\ O \\ V \end{Bmatrix} + T_{s1}' + T_{s2}' \right) \cdot \qquad (3\text{-}1)$$

$$\begin{Bmatrix} 1 + k_x & w_z & -w_y \\ -w_z & 1 + k_y & w_x \\ w_y & -w_x & 1 + k_z \end{Bmatrix} + \begin{Bmatrix} b_x \\ b_y \\ b_z \end{Bmatrix}$$

where H = Horizontal intensity of the local magnetic field; V = Vertical intensity of the local magnetic field; and $$C_n{}^b = \{C_H{}^n \cdot C_B{}^H\}^T \qquad (3\text{-}2)$$

$$C_H{}^n = \begin{Bmatrix} \cos\psi & -\sin\psi & 0 \\ \sin\psi & \cos\psi & 0 \\ 0 & 0 & 1 \end{Bmatrix} \qquad (3\text{-}3)$$

$$T_{s1}' = T_{s1} \cdot \begin{Bmatrix} \cos\beta_1 \cdot \cos\alpha_1 \\ \cos\beta_1 \cdot \sin\alpha_1 \\ -\sin\beta_1 \end{Bmatrix} \qquad (3\text{-}4)$$

$$T_{s2}' = T_{s2} \cdot \cos(\psi - \psi_o) \cdot \cos(\phi - \phi_o) \cdot \qquad (3\text{-}5)$$

$$\cos(\theta - \theta_o) \begin{Bmatrix} \cos\beta_2 \cdot \cos\alpha_2 \\ \cos\beta_2 \cdot \sin\alpha_2 \\ -\sin\beta_2 \end{Bmatrix}$$

where
$\alpha_1, \beta_1$ = direction of interfering field $T_{s1}$;
$\alpha_2, \beta_2$ = direction of interfering field $T_{s2}$; and
$\psi_o$, $\Phi_o$, $\theta_o$ = direction of maximum strength of $T_{s2}$.

Complete instrument calibration requires the determination of eighteen (18) unknowns ($T_{s1}$, $T_{s2}$, $\alpha_1$, $\alpha_2$, $\beta_1$, $\beta_2$, $\psi_o$, $\Phi_o$, $\theta_o$, $k_x$, $k_y$, $k_z$, $w_x$, $w_y$, $w_z$, $b_x$, $b_y$, $b_z$). (The intensities of H and V at the calibration are presumed to be known.)

the calibration formula (3-6) for total intensity with an approximate value $T_O$:

$$l_x = \frac{T_x' - T_x}{T_0} = A_x' + B_x' \cdot \sin\psi + C_x' \cdot \cos\psi + D_x' \cdot \Phi + E_x'\Phi^2 + F_x' \cdot \theta + G_x' \cdot \theta^2 \quad (3\text{-}8a)$$

$$l_y = \frac{T_y' - T_y}{T_0} = A_y' + B_y' \cdot \sin\psi + C_y' \cdot \cos\psi + D_y' \cdot \Phi + E_y'\Phi^2 + F_y' \cdot \theta + G_y' \cdot \theta^2 \quad (3\text{-}8b)$$

$$l_z = \frac{T_z' - T_z}{T_0} = A_z' + B_z' \cdot \sin\psi + C_z' \cdot \cos\psi + D_z' \cdot \Phi + E_z'\Phi^2 + F_z' \cdot \theta + G_z' \cdot \theta^2 \quad (3\text{-}8c)$$

The Applicant has found, on the basis of flight trials, that, in pure navigational flights (e.g. by helicopter), the magnitudes of the pitch and roll angles rarely reach 7.5° and 15° respectively. Even maximum magnitudes of 25° and 35° respectively in a high-dynamics flight following the terrain are only briefly attained.

By assuming that only roll and pitch angles of less than 50° will occur, the Applicant has found that a simplified calibration mode can be employed which substantially compensates the above-mentioned errors. In the event that a magnitude of 50° is exceeded, the magnetic support can be deactuated for the duration of such time. This can be achieved by means of relatively straightforward instrumentation.

The simplified calibration model according to the invention includes 3×7 coefficients as set forth below:

$$\Delta T_x = T_x' - T_x = A_x + B_x \cdot \sin\psi + C_x \cdot \cos\psi + \quad (3\text{-}6a)$$
$$D_x \cdot \Phi + E_x \cdot \Phi^2 + F_x \cdot \theta + G_x \cdot \theta^2$$

$$\Delta T_y = T_y' - T_y = A_y + B_y \cdot \sin\psi + C_y \cdot \cos\psi + \quad (3\text{-}6b)$$
$$D_y \cdot \Phi + E_y \cdot \Phi^2 + F_y \cdot \theta + G_y \cdot \theta^2$$

$$\Delta T_z = T_z' - T_z = A_z + B_z \cdot \sin\psi + C_z \cdot \cos\psi + \quad (3\text{-}6c)$$
$$D_z \cdot \Phi + E_z \cdot \Phi^2 + F_z \cdot \theta + G_z \cdot \theta^2$$

The theoretical values $T_x$, $T_y$, $T_z$ are defined as:

$$\begin{Bmatrix} T_x \\ T_y \\ T_z \end{Bmatrix} = C_n^b \cdot \begin{Bmatrix} H \\ O \\ V \end{Bmatrix} \quad (3\text{-}7)$$

While it initially appears that, in accordance with equation (3-6), a total of twenty-one (21) calibration coefficients must be determined, detailed analysis shows that only seven (7) unknowns must be solved as the defining equations for $A_x$, $B_x$, ..., $G_x$ are identical with those for $A_y$, $B_y$, ..., $G_y$ and for $A_z$, $B_z$, ..., $G_z$ and are completely decoupled from each other.

The calibration coefficients $A_x$, $B_x$, ..., $G_x$; $A_y$, $B_y$, ..., $G_y$ and $A_z$, $B_z$, ..., $G_z$ in equations (3-6a), (3-6b) and (3-6c) are the unknowns of calibration functions $\Delta T_x$, $\Delta T_y$ and $\Delta T_z$ that most closely approximate the most important sources of error of a three-axis magnetometer by the least squares methods. Computation formulas are based on those of the discrete Kalman filter that is particularly suitable for recurrent computation.

A recurrent algorithm is particularly advantageous for automatic calibration. In such an algorithm, new coefficients are successively computed after each new observation (observation triplet $\Delta T_x$, $\Delta T_y$, $\Delta T_z$). For numerical reasons, it is initially advantageous to scale where $$A_x' = \frac{A_x}{T_0}, \quad B_x' = \frac{B_x}{T_0}, \quad (3\text{-}9a,b,c,d,e,f)$$
$$C_x' = \frac{C_x}{T_0}, \quad D_x' = \frac{D_x}{T_0},$$
$$E_x' = \frac{E_x}{T_0}, \quad F_x' = \frac{F_x}{T_0}, \quad G_x' = \frac{G_x}{T_0}.$$

Thus, the coefficients $A_y'$, $B_y'$, ..., $G_y'$, $A_z'$, $B_z'$, ..., $G_z'$ are determined.

In the recurrent algorithm, the following initial values initially obtain:

$$A_{x0}' = B_{x0}' = C_{x0}' = D_{x0}' = E_{x0}' = F_{x0}' = G_{x0}' = 0 \quad (3\text{-}10a)$$

$$A_{y0}' = B_{y0}' = C_{y0}' = D_{y0}' = E_{y0}' = F_{y0}' = G_{y0}' = 0 \quad (3\text{-}10b)$$

$$A_{z0}' = B_{z0}' = C_{z0}' = D_{z0}' = E_{z0}' = F_{z0}' = G_{z0}' = 0 \quad (3\text{-}10c)$$

$$q_{110} = q_{220} = q_{330} = q_{440} = q_{550} = \quad (3\text{-}11a)$$
$$q_{660} = q_{770} = 100$$

$$q_{120} = q_{130} = q_{140} = q_{150} = q_{160} = q_{170} = q_{230} = \quad (3\text{-}11b)$$
$$q_{240} = q_{250} = q_{260} = q_{270} = q_{340} = q_{350} =$$
$$q_{360} = q_{370} = q_{450} = q_{460} = q_{470} = q_{560} = q_{670} = 0 \quad (3\text{-}11b)$$

$$\sigma_1 = \frac{\sigma}{T_0} \quad (3\text{-}12)$$

(Where $\sigma$=standard deviation of a magnetic field sensor, e.g.

$$\sigma_1 = \frac{0.04 \text{ A/m}}{40 \text{ A/m}} = 1 \cdot 10^{-3}$$

and e.g.

$$\sigma_p = 1.10^{-3} \text{ (noise parameter))} \quad (3\text{-}13)$$

In equations (3-11a) and (3-11b), variables $q_{11o}$, ..., $q_{HD}$ 77o $q_{12o}$, ..., $q_{67o}$ designate the initial values of the variances and covariances (correlations) respectively of the calibration coefficients to be determined. These variables serve, during subsequent computation, as an accuracy criterion for the quality of the calibration.

With each new observation triplet $l_{xk}$, $l_{yk}$, $l_{zk}$ (cf. (3-8), k designates the serial number), corrected values are obtained for the unknown calibration coefficients:

$$l_{xk}' = l_{xk} - A_{Xk-1}' - B_{Xk-1}' \cdot \sin\psi_k - C_{Xk-1}' \cdot \cos\psi_k - \quad (3\text{-}14a)$$
$$D_{Xk-1}' \cdot \Phi_k - E_{Xk-1}' \cdot \Phi_k^2 - F_{Xk-1}' \cdot \theta_k - G_{Xk-1}' \cdot \theta_k^2$$

-continued $$l_{yk}' = l_{yk} - A_{yk-1}' - B_{yk-1}' \cdot \sin\psi_k - C_{yk-1}' \cdot \cos\psi_k - \quad (3\text{-}14b)$$
$$D_{yk-1}' \cdot \Phi_k - E_{yk-1}' \cdot \Phi_k^2 - F_{yk-1}' \cdot \theta_k - G_{yk-1}' \cdot \theta_k^2$$

$$l_{zk}' = l_{zk} - A_{zk-1}' - B_{zk-1}' \cdot \sin\psi_k - C_{zk-1}' \cdot \cos\psi_k - \quad (3\text{-}14c)$$
$$D_{zk-1}' \cdot \Phi_k - E_{zk-1}' \cdot \Phi_k^2 - F_{zk-1}' \cdot \theta_k - G_{zk-1}' \cdot \theta_k^2$$

$$\begin{bmatrix} a_1 \\ a_2 \\ a_3 \\ a_4 \\ a_5 \\ a_6 \\ a_7 \end{bmatrix} = \begin{bmatrix} q_{11} & q_{12} & q_{13} & q_{14} & q_{15} & q_{16} & q_{17} \\ q_{12} & q_{22} & q_{23} & q_{24} & q_{25} & q_{26} & q_{27} \\ q_{13} & q_{23} & q_{33} & q_{34} & q_{35} & q_{36} & q_{37} \\ q_{14} & q_{24} & q_{34} & q_{44} & q_{45} & q_{46} & q_{47} \\ q_{15} & q_{25} & q_{35} & q_{45} & q_{55} & q_{56} & q_{57} \\ q_{16} & q_{26} & q_{36} & q_{46} & q_{56} & q_{66} & q_{67} \\ q_{17} & q_{27} & q_{37} & q_{47} & q_{57} & q_{67} & q_{77} \end{bmatrix}_{k-1} \cdot \begin{bmatrix} 1 \\ \sin\psi_k \\ \cos\psi_k \\ \Phi_k \\ \Phi_k^2 \\ \theta_k \\ \theta_k^2 \end{bmatrix} \quad (3\text{-}15)$$

$$d = a_1 + a_2 \cdot \sin\psi_k + a_3 \cdot \cos\psi_k + a_4 \cdot \Phi_k + a_5 \cdot \Phi_k^2 + \quad (3\text{-}16)$$
$$a_6 \cdot \theta_k + a_7 \cdot \theta_k^2 + \sigma_l^2$$

$$g_1 = \frac{a_1}{d} \quad (3\text{-}17a)$$

$$g_2 = \frac{a_2}{d} \quad (3\text{-}17b)$$

$$g_3 = \frac{a_3}{d} \quad (3\text{-}17c)$$

$$g_4 = \frac{a_4}{d} \quad (3\text{-}17d)$$

$$g_5 = \frac{a_5}{d} \quad (3\text{-}17e)$$

$$g_6 = \frac{a_6}{d} \quad (3\text{-}17f)$$

$$g_7 = \frac{a_7}{d} \quad (3\text{-}17g)$$

$$A_{Xk}' = A_{Xk-1}' + g_1 \cdot l_{Xk}' \quad (3\text{-}18a)$$
$$B_{Xk}' = B_{Xk-1}' + g_2 \cdot l_{Xk}' \quad (3\text{-}18b)$$
$$C_{Xk}' = C_{Xk-1}' + g_3 \cdot l_{Xk}' \quad (3\text{-}18c)$$
$$D_{Xk}' = D_{Xk-1}' + g_4 \cdot l_{Xk}' \quad (3\text{-}18d)$$
$$E_{Xk}' = E_{Xk-1}' + g_5 \cdot l_{Xk}' \quad (3\text{-}18e)$$
$$F_{Xk}' = F_{Xk-1}' + g_6 \cdot l_{Xk}' \quad (3\text{-}18f)$$
$$G_{Xk}' = G_{Xk-1}' + g_7 \cdot l_{Xk}' \quad (3\text{-}18g)$$
$$A_{Yk}' = A_{Yk-1}' + g_1 \cdot l_{Yk}' \quad (3\text{-}19a)$$
$$B_{Yk}' = B_{Yk-1}' + g_2 \cdot l_{Yk}' \quad (3\text{-}19b)$$
$$C_{Yk}' = C_{Yk-1}' + g_3 \cdot l_{Yk}' \quad (3\text{-}19c)$$
$$D_{Yk}' = D_{Yk-1}' + g_4 \cdot l_{Yk}' \quad (3\text{-}19d)$$
$$E_{Yk}' = E_{Yk-1}' + g_5 \cdot l_{Yk}' \quad (3\text{-}19e)$$
$$F_{Yk}' = F_{Yk-1}' + g_6 \cdot l_{Yk}' \quad (3\text{-}19f)$$
$$G_{Yk}' = G_{Yk-1}' + g_7 \cdot l_{Yk}' \quad (3\text{-}19g)$$
$$A_{Zk}' = A_{Zk-1}' + g_1 \cdot l_{Zk}' \quad (3\text{-}20a)$$
$$B_{Zk}' = B_{Zk-1}' + g_2 \cdot l_{Zk}' \quad (3\text{-}20b)$$
$$C_{Zk}' = C_{Zk-1}' + g_3 \cdot l_{Zk}' \quad (3\text{-}20c)$$
$$D_{Zk}' = D_{Zk-1}' + g_4 \cdot l_{Zk}' \quad (3\text{-}20d)$$

-continued $$E_{Zk}' = E_{Zk-1}' + g_5 \cdot l_{Zk}' \quad (3\text{-}20e)$$
$$F_{Zk}' = F_{Zk-1}' + g_6 \cdot l_{Zk}' \quad (3\text{-}20f)$$
$$G_{Zk}' = G_{Zk-1}' + g_7 \cdot l_{Zk}' \quad (3\text{-}20g)$$
$$q_{11k} = q_{11k-1} - a_1 \cdot g_1 + \sigma_p^2 \quad (3\text{-}21a)$$
$$q_{12k} = q_{12k-1} - a_2 \cdot g_1 \quad (3\text{-}21b)$$
$$q_{13k} = q_{13k-1} - a_3 \cdot g_1 \quad (3\text{-}21c)$$
$$q_{14k} = q_{14k-1} - a_4 \cdot g_1 \quad (3\text{-}21d)$$
$$q_{15k} = q_{15k-1} - a_5 \cdot g_1 \quad (3\text{-}21e)$$
$$q_{16k} = q_{16k-1} - a_6 \cdot g_1 \quad (3\text{-}21f)$$
$$q_{17k} = q_{17k-1} - a_7 \cdot g_1 \quad (3\text{-}21g)$$
$$q_{22k} = q_{22k-1} - a_2 \cdot g_2 + \sigma_p^2 \quad (3\text{-}21h)$$
$$q_{23k} = q_{23k-1} - a_3 \cdot g_2 \quad (3\text{-}21i)$$
$$q_{24k} = q_{24k-1} - a_4 \cdot g_2 \quad (3\text{-}21j)$$
$$q_{25k} = q_{25k-1} - a_5 \cdot g_2 \quad (3\text{-}21k)$$
$$q_{26k} = q_{26k-1} - a_6 \cdot g_2 \quad (3\text{-}21l)$$
$$q_{27k} = q_{27k-1} - a_7 \cdot g_2 \quad (3\text{-}21m)$$
$$q_{33k} = q_{33k-1} - a_3 \cdot g_3 + \sigma_p^2 \quad (3\text{-}21n)$$
$$q_{34k} = q_{34k-1} - a_4 \cdot g_3 \quad (3\text{-}21o)$$
$$q_{35k} = q_{35k-1} - a_5 \cdot g_3 \quad (3\text{-}21p)$$
$$q_{36k} = q_{36k-1} - a_6 \cdot g_3 \quad (3\text{-}21q)$$
$$q_{37k} = q_{37k-1} - a_7 \cdot g_3 \quad (3\text{-}21r)$$
$$q_{44k} = q_{44k-1} - a_4 \cdot g_4 + \sigma_p^2 \quad (3\text{-}21s)$$
$$q_{45k} = q_{45k-1} - a_5 \cdot g_4 \quad (3\text{-}21t)$$
$$q_{46k} = q_{46k-1} - a_6 \cdot g_4 \quad (3\text{-}21u)$$
$$q_{47k} = q_{47k-1} - a_7 \cdot g_4 \quad (3\text{-}21v)$$
$$q_{55k} = q_{55k-1} - a_5 \cdot g_5 + \sigma_p^2 \quad (3\text{-}21w)$$
$$q_{56k} = q_{56k-1} - a_6 \cdot g_5 \quad (3\text{-}21x)$$
$$q_{57k} = q_{57k-1} - a_7 \cdot g_5 \quad (3\text{-}21y)$$
$$q_{66k} = q_{66k-1} - a_6 \cdot g_6 + \sigma_p^2 \quad (3\text{-}21z)$$
$$q_{67k} = q_{67k-1} - a_7 \cdot g_6 \quad (3\text{-}21\alpha)$$
$$q_{77k} = q_{77k-1} - a_7 \cdot g_7 + \sigma_p^2 \quad (3\text{-}21\beta)$$

The values $q_{11}, q_{22}, \ldots, q_{77}$ are a measure of the accuracy or definiteness of the coefficients $A_x', B_x', \ldots, G_x', A_y', B_y', \ldots, A_z', B_z', \ldots, G_z'$ and can be used as a criterion for interrupting the recurrent computation, if, for example:

$$q_{11} + q_{22} + q_{33} + q_{44} + q_{55} + q_{66} + q_{77} < 10\sigma_p^2 \quad (3\text{-}22)$$

The interruption conditions may be further sharpened (or specified), if, for example, specific angular ranges such as $\psi$: 0°      360°
$\Phi$: −30°      +30°
$\theta$: −30°      +30° have been determined, so that (indirectly determined) calibration flight maneuvers can be specified.

The coefficients $A_x, B_x, \ldots, G_x, A_y, B_y, \ldots G_y, A_z, B_z, \ldots, G_z$ are obtained by inversion of equation (3-9). That is, by multiplication by $T_O$ as, for example:

$$A_x = A_x' \cdot T_0 \qquad (3\text{-}23)$$

During subsequent use of the magnetometer, the coefficients are employed to compute corrected values $T_x{}^c$, $T_y{}^x$, and $T_z{}^c$ from the "raw" measured values $T_x'$, $T_y'$, and $T_z'$:

$$T_x{}^c = T_x' + V_x \qquad (3\text{-}24a)$$

$$T_y{}^c = T_y' + V_y \qquad (3\text{-}24b)$$

$$T_z{}^c = T_z' + V_z \qquad (3\text{-}24c)$$

where $$V_x = -A_x - B_x \cdot \sin\psi - C_x \cdot \cos\psi - \qquad (3\text{-}25a)$$
$$D_x \cdot \Phi - E_x \cdot \theta^2 - F_x \cdot \theta - G_x \cdot \theta^2$$

$$V_y = -A_y - B_y \cdot \sin\psi - C_y \cdot \cos\psi - \qquad (3\text{-}25b)$$
$$D_y \cdot \Phi - E_y \cdot \theta^2 - F_y \cdot \theta - G_y \cdot \theta^2$$

$$V_z = -A_z - B_z \cdot \sin\psi - C_z \cdot \cos\psi - \qquad (3\text{-}25c)$$
$$D_z \cdot \Phi - E_z \cdot \theta^2 - F_z \cdot \theta - G_z \cdot \theta^2$$

Corrected route angle $\psi_m{}^c$ with respect to magnetic north, is then computed in accordance with equations 2-1, 2, and 3. In this calculation, the corrected intensity components $T_x{}^c$, $T_y{}^c$, $T_z{}^c$ are utilized. A route angle value $\psi$ is required for computation of the correction values $V_x$, $V_y$, $V_z$. Without a loss of accuracy, $\psi$ may be initially computed from the uncorrected values $T_x'$, $T_y'$ and $T_z'$. In the event of excessively large differences ($>5°$), it is advantageous to compute the corrections two times.

Correction made in accordance with equations 3-24, 25 is useful for the route and course angle ranges that were determined during the calibration flight. If possible (in the event that at least three reference points were flown), the positions on the circle of the differences required for the calibration in relation to the theoretical value ($l_x$, $l_y$, $l_z$; cf. equation 3-8) should as far as possible be equally spaced to avoid an accumulation of measured values at one position. Moreover, the algorithm presupposes equally accurate differences $l_x$, $l_y$, $l_z$. The theoretical values (reference directions) required for automatic calibration are obtained from an initial reference direction (e.g. by gyrocompassing) that is extrapolated in a subsequent calibration flight by gyros that are stable on a short-term basis. A constant gyro drift can be determined by expansion of the calibration model in the event this should interfere with the accuracy of the calibration. The determination and correction of g-dependent gyro drifts are more difficult.

Local magnetic variation (declination) must be taken into consideration in the application of a reference direction related to geographic north. An accurate calibration presupposes a homogeneous magnetic field, the intensity and inclination of which are known. Further, the calibration should not take place in the vicinity of local interfering fields or anomalies.

The subsidiary conditions for automatic (in flight) calibration may very readily be fulfilled with, for example, a helicopter. A suitable flight maneuver that sweeps over all route and pitch course angle ranges required for calibration is a so-called "horizontal eight." The possible roll and pitch angle ranges are flown for subsequent use. The maximum and minimum roll and pitch angles reached in the calibration flight serve as the limit values of the valid range of the correction function, (equations 3-24 and 25 respectively). The cutoff conditions for valid magnetometer data are established with reference to such values. Test computations in accordance with the invention show that, for a magnetic field of intensity $T = 32$ A/m and $I = 60°$, the calibration method compensates the following errors: 1 A/m (interfering fields); 3 percent (scale factor); 0.1° (orientation of axes); and 1 A/m (bias) to a course accuracy of better than 0.2° for a course angle range of $\pm 30°$. (A horizontal eight flight figure with roll and pitch angle ranges of $\pm 30°$ was simulated.)

In the event that an initial reference direction is not known (if, for example, gyro drift prevents accurate gyrocompassing), then, in the first instance, an error-free initial direction (first course value $\psi m$ according to equation 2-3) is assumed. Then, as above described, deviations (observations) $l_x$, $l_y$, $l_z$ are computed in accordance with equation 3.8. An erroneous initial orientation introduces a constant course error. Subsequently, in the navigational flight with the system, this error generates a transverse deviation $\Delta q$ that can be used to compute a course correction $V_A$ ($\hat{=}$error of the initial direction). The transverse deviation $\Delta q$ is computed from the theoretical ($\rho$, $\lambda$) and actual coordinates ($\rho'$, $\lambda'$) of the two reference points flown (flight direction from $P_1$ to $P_2$):

$$\Delta X = (\rho_2 - \rho_1) \cdot R_M \qquad (3\text{-}26a)$$

$$\Delta Y = (\lambda_2 - \lambda_1) \cdot R_N \qquad (3\text{-}26b)$$

$$\Delta X' = (\rho_2' - \rho_1') \cdot R_M \qquad (3\text{-}26c)$$

$$\Delta Y' = (\lambda_2' - \lambda_1') \cdot R_N \qquad (3\text{-}26d)$$

$\rho_i$, $\rho'$ = Latitude (theoretical, actual)
$\lambda_i'$, $\lambda'$ = Longitude (theoretical, actual)

where $$R_M = \frac{a(1 - e^2)}{(1 - e^2 \sin^2\rho)^{3/2}} \qquad (3\text{-}27)$$

$$R_N = \frac{a \cdot \cos\rho}{\sqrt{1 - e^2 \sin^2\rho}} \qquad (3\text{-}28)$$

a, e = ellipsoid parameters (semimajor axis a, 1. Eccentricity e)

$$\Delta q = -\Delta N \cdot \sin\psi + \Delta E \cdot \cos\psi \qquad (3\text{-}30)$$

where $$\Delta N = \Delta X - \Delta X' \qquad (3\text{-}31a)$$

$$\Delta E = \Delta Y - \Delta Y' \qquad (3\text{-}31b)$$

$$\psi = \arctan \frac{\Delta Y}{\Delta X} \qquad (3\text{-}32)$$

t = route angle

From the transverse deviation and the distance S traversed, $$S = \sqrt{\Delta X^2 + \Delta Y^2} \tag{3-33}$$

the course correction $V_A$ is finally computed:

$$V_A = \arctan \frac{\Delta q}{S} \tag{3-34}$$

The accuracy achieved by the latter method increases with the separation of the reference points. A minimum separation of between 5 and 10 km may be employed and increased by the application of several reference points $P_1$, $P_2$, $P_3$, ... (e.g. triangular flight). Suitable references are not only signalized points, the coordinates of which are known, but also clearly defined points in the terrain (e.g. road intersections), the coordinates of which can be inferred from a large-scale map ($>1:50,000$). In conjunction with a map display, coordinate differences determined automatically by pressing a button can be fed directly into the calibration process.

Thereafter, individually determined course corrections ($V_A$) are combined in the following manner to form the final correction $V_A$:

$$V_A = \frac{\Sigma p_i V_{ai}}{\Sigma p_i} \tag{3-35}$$

where $$P_i = S_i \tag{3-36}$$

In this procedure, the individual course corrections receive individual weightings $P_i$ that depend upon the spacing of the reference points used for the computation of the course correction.

In the event of the use of the magnetometer for course support, the following correction should also be taken into consideration:

$$= f(T_x{}^c, T_y{}^c, T_z{}^c) + V_A \tag{3-37}$$

where $T_x{}^c$, $T_y{}^c$, $T_z{}^c$: intensities corrected in accordance with equation 3-25; f(): cf. (2-1, 2, 3) $\psi_m{}^c$: corrected route angle By the additional correction, it is possible to eliminate not only the constant mounting or calibration error of a flux valve, but also the installation error of, for example, a Doppler velocity sensor. Likewise, local or temporally-variable anomalies of the magnetic field of the earth at the calibration location remain without effect on the subsequent course accuracy. The true value of the local magnetic variation (declination) is not required since an erroneous value of the local magnetic variation, just like an erroneous "north orientation" of the reference coordinate system (navigation coordinate system) is compensated.

If the method is repeated at intervals of time, then the long-term (annual) changes of the magnetic field of the earth are also determined. Thus, it is no longer necessary to, for example, annually update or recompute the variation model of the earth's magnetic field. By applying several reference points (which should lie far apart—(30 to 100 km if possible)), it is possible not only to increase the accuracy of calibration, but also to eliminate local anomalies in the earth's magnetic field to a very great extent. The Figure illustrates the interconnection of the navigation system and devices in accordance with the present invention.

The calibration method according to the invention should be carried out afresh in the event of any change in the magnetic properties of the aircraft (e.g. exchange or addition of iron-containing, magnetic materials) or the exchange of the magnetometer or a Doppler velocity sensor. Changes of this nature occasion not only changes in cyclic errors, but also in the constant error term. If the calibration flight is repeated to determine the constant error term at time intervals (e.g. annually), then the temporal variation of the earth's magnetic field (magnetic variation; 0.15°/year is automatically taken into consideration since such changes are nearly constant over a large area and the earth's magnetic field varies only to a relatively insignificant degree. Appendix I presents the listing of a computer program, written in the FORTRAN language, for performing the computations discussed above.

Thus, it is seen that the present invention achieves the aforesaid objects. While the invention has been described with reference to its presently preferred embodiment, it is by no means limited thereto. Rather, its scope is only limited insofar as defined by the following set of claims and includes all equivalents thereof.

What is claimed is:

1. A method for automatic calibration of the course accuracy of a three-axis magnetometer that is fixedly mounted in an aircraft and is subject to interference fields and instrumental errors comprising the steps of:

(a) determining initial reference direction, at a preselected calibration location characterized by a homogeneous magnetic field of known intensity and inclination that is free from anomalies, by means of at least one gyroscope having short-term stability; then (b) determining the theoretical values of the mutually perpendicular reference components $T_x$, $T_y$ and $T_z$ of the earth's magnetic field required for said calibration; then (c) sweeping over all route angles and course angle ranges, within established limiting roll and pitch angle values, required for said calibration during a flight maneuver; and (d) continuously observing during said flight maneuver the deviations $\Delta T_x = T_x' - T_x$, $\Delta T_y = T_y' - T_y$ and $\Delta T_z = T_z' - T_z$ of the instantaneous magnetic field components $T_x'$, $T_y'$, $T_z'$ from the reference components $T_x$, $T_y$ and $T_z$; and (e) reading said deviations into a computer; then (f) recurrently computing, after the occurrence of each observation triplet, $\Delta T_x$, $\Delta T_y$ and $\Delta T_z$, in accordance with the calibration functions:

$$\Delta T_x = T_x' - T_x = A_x + B_x \sin \psi + C_x \cos \psi + D_x \Phi + E_x \Phi^2 + F_x \theta + G_x \theta^2 \tag{1a}$$

$$\Delta T_y = T_y' - T_y = A_y + B_y \sin \psi + C_y \cos \psi + D_y \Phi + E_y \Phi^2 + F_y \theta + G_y \theta^2 \tag{1b}$$

$$\Delta T_z = T_z' - T_z = A_z + B_z \sin \psi + C_z \cos \psi + D_z \Phi + E_z \Phi^2 + F_z \theta + G_z \theta^2 \tag{1c}$$

where $\psi$ is the route angle, $\Phi$ is the roll angle and $\theta$ is the pitch angle, correction coefficients $A_x, B_x, \ldots G_x$
$A_y, B_y, \ldots G_y$
$A_z, B_z, \ldots G_z$ having initial conditions:
$A_x, B_x, \ldots G_x = 0$
$A_y, B_y, \ldots G_y = 0$
$A_z, B_z, \ldots G_z = 0$
up to a predeterminable accuracy; then (g) transforming the instantaneous magnetic field components to corrected intensity components $T_x^c, T_y^c, T_z^c$ in accordance with:

$$T_x^c = T_x' + V_x \qquad (2a)$$

$$T_y^c = T_y' + V_y \qquad (2b)$$

$$T_z^c = T_z' + V_z \qquad (2c)$$

with the correction values $$V_x = -A_x - B_x \sin\psi - C_x\cos\psi - D_x\cdot\Phi - E_x\cdot\Phi^2 - F_x\cdot\theta - G_x\cdot\theta^2 \qquad (3a)$$

$$V_y = -A_y - B_y \sin\psi - C_y\cos\psi - D_y\cdot\Phi - E_y\cdot\Phi^2 - F_y\cdot\theta - G_y\cdot\theta^2 \qquad (3b)$$

$$V_z = -A_z - B_z \sin\psi - C_z\cos\psi - D_z\cdot\Phi - E_z\cdot\Phi^2 - F_z\cdot\theta - G_z\cdot\theta^2 \qquad (3c);$$

and then (h) determining a corrected route angle $\psi^c_m$ from the equations of step (g).

2. A method for automatic calibration of the course accuracy of a three-axis magnetometer that is fixedly mounted in an aircraft and is subject to interference fields and instrumental errors comprising the steps of:

(a) establishing an estimated initial reference direction at a preselected calibration location that is characterized by a homogeneous magnetic field of known intensity and inclination and free from anomalies; then (b) determining the theoretical values of the mutually perpendicular reference components $T_x$, $T_y$ and $T_z$ of the earth's magnetic field required for calibration from said estimated initial reference direction by means of a gyroscope having short-term stability; then (c) sweeping all route angles and course angle ranges, within established limiting roll and pitch angle values, required for calibration during a flight maneuver; and (d) continuously observing during said flight maneuver the deviations $\Delta T_x = T_x' - T_x$, $\Delta T_y = T_y' - T_y$ and $\Delta T_z = T_z' - T_z$ of the instantaneous magnetic field components $T_x', T_y', T_z'$ from the reference components $T_x, T_y, T_z$; and (e) reading said deviations into a computer; then (f) recurrently computing, after the occurrence of each observation triplet, $\Delta T_x$, $\Delta T_y$ and $\Delta T_z$, in accordance with the calibration functions:

$$\Delta T_x = T_x' - T_x = A_x + B_x\sin\psi + C_x\cos\psi + D_x\cdot\Phi + E_x\cdot\Phi^2 + F_x\cdot\theta + G_x\cdot\theta^2 \qquad (1a)$$

$$\Delta T_y = T_y' - T_y = A_y + B_y\sin\psi + C_y\cos\psi + D_y\cdot\Phi + E_y\cdot\Phi^2 + F_y\cdot\theta + G_y\cdot\theta^2 \qquad (1b)$$

$$T_z = T_z' - T_z = A_z + B_z\sin\psi + C_z\cos\psi + D_z\cdot\Phi + E_z\cdot\Phi^2 + F_z\cdot\theta + G_z\cdot\theta^2 \qquad (1c)$$

where $\psi$ designates the route angle, $\Phi$ designates the roll angle and $\theta$ designates the pitch angle, correction coefficients
$A_x, B_x, \ldots G_x$
$A_y, B_y, \ldots G_y$
$A_z, B_z, \ldots G_z$
having initial conditions
$A_x, B_x, \ldots G_x = 0$
$A_y, B_y, \ldots G_y = 0$
$A_z, B_z, \ldots G_z = 0$
up to a predeterminable accuracy; then (g) transforming the instantaneous magnetic field components to corrected intensity components in accordance with:

$$T_x^c = T_x' + V_x \qquad (2a)$$

$$T_y^c = T_y' + V_y \qquad (2b)$$

$$T_z^c = T_z' + V_z \qquad (2c)$$

with the correction values $$V_x = -A_x - B_x\sin\psi - C_x\cos\psi - D_x\cdot\Phi - E_x\cdot\Phi^2 - F_x\cdot\theta - G_x\cdot\theta^2 \qquad (3a)$$

$$V_y = -A_y - B_y\sin\psi - C_y\cos\psi - D_y\cdot\Phi - E_y\cdot\Phi^2 - F_y\cdot\theta - G_y\cdot\theta^2 \qquad (3b)$$

$$V_z = -A_z - B_z\sin\psi - C_z\cos\psi - D_z\cdot\Phi - E_z\cdot\Phi^2 - F_z\cdot\theta - G_z\cdot\theta^2 \qquad (3c);$$

then (h) determining a corrected route angle $\psi^c_m$ from the equations of step (g) by inserting the uncorrected value of route angle $\psi$ into equations 3(a), 3(b) and 3(c); then (i) performing a further calibration flight between at least two reference points ($P_1$, $P_2$) of known coordinates ($\rho_1, \rho_2; \lambda_1, \lambda_2$); then (j) determining a course correction defined as $$V_A = \arctan\frac{\Delta q}{S} \qquad (4a)$$

$$\Delta q = (\Delta X' - \Delta X)\sin\left(\arctan\frac{\Delta Y}{\Delta X}\right) + (\Delta Y - \Delta Y')\cos\left(\arctan\frac{\Delta Y}{\Delta X}\right) \qquad (4b)$$

and where ($\Delta X - \Delta X'$) = path difference in the latitudinal direction in flight between the reference points ($P_1$, $P_2$);

($\Delta Y - \Delta Y'$) = path difference in the longitudinal direction in flight between the reference points ($P_1$, $P_2$);

arc tan $\Delta Y/\Delta X$ = route angle; and $S$ = path traversed between the reference points ($P_1$, $P_2$); and then (k) determining said corrected route angle as $$\psi_m^c = f(T_x^c, T_y^c, T_z^c) + V_A \qquad (5b).$$

3. A method as defined in claim 2 further including the steps of:

(a) flying at least three reference points ($P_1, P_2, P_3, \ldots$); and (b) determining a course correction $V_a$ in accordance with the relation:

$$V_A = \frac{\Sigma p_i \cdot V_{Ai}}{\Sigma p_i} \quad \left[ V_A = \frac{\Sigma \rho_i \cdot V_i}{\Sigma \rho_i} \right]$$

$V_{Ai}$=course correction value of a respective length $S_{12}, S_{23}, S_{34}, \ldots$; and $p_i$=weightings to take account of the individual accuracy of an individual value $V_{Ai}$ with reference to the respective length $S_i = S_{12}, S_{23}, S_{34}, \ldots$ between said reference points $P_1, P_2, P_3, P_4 \ldots$.

4. A method as defined in claim 2 wherein the step of determining said course correction $V_A$ is used to calibrate the mounting error of a speed sensor.

5. A method as defined in claim 2 wherein the step of determining said course correction $V_A$ is used to calibrate the mounting error of an inertial accelerometer.

6. A method as defined in claim 2 wherein the step of determining said course correction $V_A$ is used to determine local magnetic variation.

7. A method as defined in claim 3 further characterized in that:
 (a) the three reference points ($P_1, P_2, P_3, \ldots$) are chosen as vertices of a triangle; and
 (b) the calibrating flight comprises a triangular flight over the reference points in both the clockwise and counterclockwise directions.

* * * * *